United States Patent [19]

Yagi et al.

[11] 4,344,679

[45] Aug. 17, 1982

[54] CAMERA WITH PHOTOELECTRIC FOCUS DETECTING DEVICE

[75] Inventors: Michio Yagi, Hachioji; Hiroshi Sawano, Tokorozawa, both of Japan

[73] Assignee: Konishiroku Photo Industry Co., Ltd., Tokyo, Japan

[21] Appl. No.: 80,585

[22] Filed: Oct. 1, 1979

[30] Foreign Application Priority Data

Oct. 2, 1978 [JP] Japan .................................. 53-120441

[51] Int. Cl.³ ...................... G03B 13/18; G03B 17/18
[52] U.S. Cl. ................................... 354/25; 354/60 E
[58] Field of Search ............. 354/25, 53, 25 A, 25 P, 354/31 F, 25 N, 25 R, 195-198, 60 E, 60 L; 352/140; 250/201, 204; 358/227

[56] References Cited

U.S. PATENT DOCUMENTS

| | | | |
|---|---|---|---|
| 4,080,531 | 3/1978 | Stauffer | 354/25 X |
| 4,142,788 | 3/1979 | Matsumoto et al. | 354/60 E |
| 4,157,217 | 5/1979 | Isono | 354/25 |
| 4,182,563 | 1/1980 | Biber | 354/197 |

*Primary Examiner*—Richard A. Wintercorn
*Assistant Examiner*—William B. Perkey
*Attorney, Agent, or Firm*—James E. Nilles

[57] ABSTRACT

A camera including a photoelectric focus detecting device, the focused condition judgement level of which can be changed in accordance with the range of depth of focus or field of a photographing lens, with the change in an aperture value or value of an iris diaphragm, with the change or difference in the focal length of the lens, or with the difference in the wide-open F-number of an interchangeable lens.

1 Claim, 5 Drawing Figures

CAMERA WITH PHOTOELECTRIC FOCUS DETECTING DEVICE

BACKGROUND OF THE INVENTION

The present invention relates to improvements in a camera having a photoelectric focus detecting device.

The conventional photoelectric focus detecting device of a camera has detected electric signals of a focused condition detecting circuit, of which levels are decreased or increased according to the focused condition, thereby to judge that it is under the focused condition when the aforementioned electric signals are lower or higher than a preset level for judgement.

In a single lens reflex camera, on the other hand, the system, in which the focus detection of the so-called "TTL" type is adopted, has been conceived by arranging the light receiving unit of the photoelectric focus detecting device in an optical path at the back of an objective lens. In the single lens reflex camera, generally speaking, since an object to be photographed is usually observed under the condition that an aperture of an iris diaphragm is in a wide-open state, the focus detecting operations are often performed with the wide-open iris diaphragm, too. In the conventional focus detecting device of that type, therefore, the range of depth of focus under the wide-open iris condition has been used as a reference level or range for focus judgement after they had been converted into the judgement level or range.

Here, the case of a camera of interchangeable lens type will be discussed. Since the interchangeable lenses are different in their wide-open F-number, focal length, lens construction and the like, they have accordingly different ranges of depth of focus when the iris is widely open. As a result, in case the level for judgement at the side of the focus detecting device is preset such that the level of a certain lens is used as a reference, a difference between the focused condition displayed in accordance with the judgement level and the actual focused condition on a film plane may be invited depending upon the kind of lenses interchanged. For instance, in case a lens having a small wide-open F-number is mounted on a camera having the aforementioned judgement level preset on the basis of such a range of depth of focus (e.g., its high value) with the wide-open iris as belongs to the lens having a relatively large wide-open F-number, the display of "It is in focus." is made by the focused condition display based on the judgement level, even if the actual focused condition on the film plane still fails to form a clear image, because there is a difference in the range of depth of focus. This results in formation of an image out of focus. In the contrary case, moreover, the display based on the judgement level indicates "It is still out of focus.", although a clear image has already been formed on the film plane. This invites the result that a photographer has to continue the focusing operations which might otherwise be unnecessary.

The results thus far described are also invited by the difference in the focal length and in the lens construction and are accordingly detrimental to the device of that type.

Such discrepancy between the focused condition displayed based on the judgement level and the actual focused condition on the film plane, which is caused by the difference in the range of depth of focus, takes place in the cases other than that of the lens interchange, too.

More specifically, the first one is the case, in which the setting of the judgement level is performed on the basis of the range of depth of focus with the iris being widely open whereas the actual photography is accomplished with the iris being partially open. In the second case, the focal length is changed for a lens having a variable focal length such as a zoom lens.

The former case often takes place with a single lens reflex camera adopting the focus detecting system of "TTL" type. More specifically, in the case of the single lens reflex camera, the observation of an object to be photographed has to be performed under the condition having the iris widely opened, so that the focus detecting operation cannot be performed under any other condition than that with the widely open iris, as has been discussed before. In this instance, moreover, since the focus detection has to be effected even with the widely open iris, the setting of the judgement level is often based on the range of focus under the same condition. Since, however, the normal photography is usually accomplished with an aperture or iris diaphragm in a range of F-number of 4 to 8 having a relatively high range of depth of focus, this case is also accompanied with one of the aforementioned disadvantages that the display based on the judgement level indicates "It is still out of focus." although a clear image has already been formed on the film plane.

In the latter case, on the other hand, a problem is raised by a zoom lens of the type, in which the minimum F-number and accordingly the range of depth of focus is varied upon the zooming operation in accordance with the change in the focal length. Similar disadvantage to those of the foregoing two cases is also invited.

In case, on the other hand, the judgement level is set by the use of the range of depth of field in place of the range of depth of focus, similar disadvantage to the aforementioned one coming from the difference in the range of depth of focus is also invited.

SUMMARY OF THE INVENTION

Therefore, the present invention contemplates to eliminate those disadvantages concomitant with the prior art.

It is an object of the present invention to provide a camera equipped with a photoelectric focus detecting device, which camera is characterized in that the setting of a level for judgement of a focused condition can be changed in accordance with the difference in the range of depth of focus or field of a photographing lens.

Another object of the present invention is to provide a camera equipped with a photoelectric focus detecting device, which camera is characterized in that the judgement level is changed for such a variation in the range of depth of focus or field of a photographing lens accompanying the change in an aperture value or value of an iris diaphragm.

A further object of the present invention is to provide a camera equipped with a photoelectric focus detecting device, which camera is characterized in that the judgement level is changed for such a variation in the range of depth of focus or field of a photographing lens accompanying the change or difference in the focal length of the lens.

A further object of the present invention is to provide a camera equipped with a photoelectric focus detecting device, which camera is characterized in that the judgement level is changed for such a variation in the range of depth of focus or field accompanying the difference in the wide-open F-number of an interchangeable lens.

DESCRIPTION OF THE PREFERRED EMBODIMENTS

Figure 1:
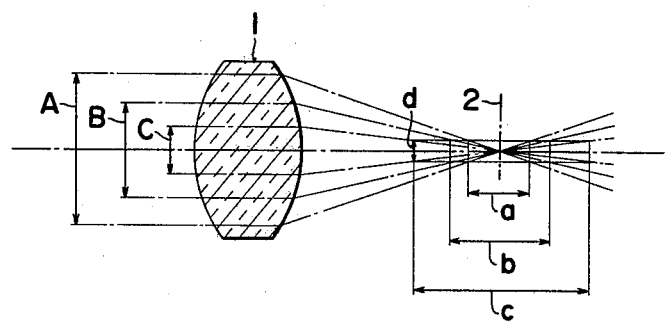
FIG. 1 is an explanative view illustrating the relationship between the diaphragm value and the range of depth of focus.

FIG. 1 shows the relationship between the diaphragm value (or the F-number) and the depth of focus, in which it is shown that the range of depth of focus is widened from a through b to c in accordance with the change of diaphragm value to be stopped down from wide-open iris A to partly closed irises B and C and the image to be focused within that range can be obtained as a clear image on a film plane 2 as well as the image which is focusing thereon, as per se well known. In FIG. 1, reference letter d indicates the diameter of a scatter circle allowable. In case, moreover, a light receiving unit of the focused condition detecting circuit of a photoelectric focus detecting device is placed in a position corresponding to the film plane, focused condition electric signals at such a voltage as is lowered or raised as the image to be photographed comes to a focus point are generated by the aforementioned focused condition detecting circuit. The output thus generated is varied, if the case of the lowered voltage is taken by way of example, in accordance with the curve V shown in FIG. 2.

Figure 2:
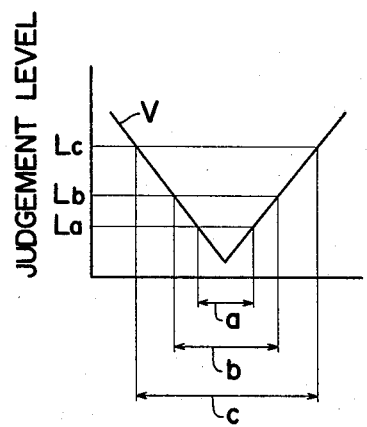
FIG. 2 is an explanative view illustrating the relationship between the range of depth of focus and the judgement level.
Figure 3:
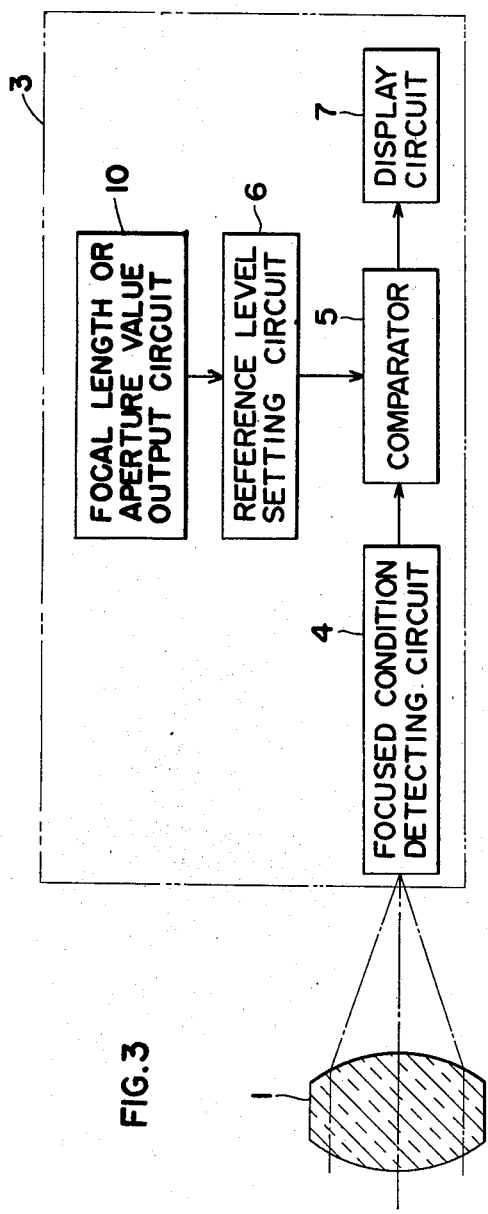
FIG. 3 is a block diagram showing one embodiment of the present invention.

Now, FIG. 3 shows an embodiment according to the present invention in case the preset value or range of the judgement level is changed in accordance with the variation in the diaphragm value. Indicated at reference numerals 1 and 3 are the photographing lens and photoelectric focus detecting device, respectively, the latter of which is composed of a focused condition detecting circuit 4, a comparator circuit 5, a reference level setting circuit 6 and a display circuit 7. Here, if the light having passed through the photographing lens 1 goes into the light receiving unit of the focused condition detecting circuit 4 which is arranged at a position corresponding to the focal plane of the lens 1 shown in FIG. 1, i.e., on the film plane 2, the aforementioned detecting circuit 4 generates such electric signals as are shown in the curve V in FIG. 2 in accordance with the focused condition so that the electric signals are fed to the comparator circuit 5. When the diaphragm or iris diaphragm is stopped down from the wide-open iris A to the partial irises B and C, the respective ranges of depth of focus are so widened, as shown in FIG. 1, that the judgement level of the aforementioned electric signals corresponding to the range, within which the clear image can be formed on the film plane, i.e., the reference value or range for focus judgement is varied from La to Lb and further to Lc in accordance with the differences in the range of depth of focus relating to the respective irises. On the other hand, the reference level setting circuit 6 appearing in FIG. 3 is used to set those judgement levels La, Lb and Lc. In response to the iris-out operation by a not-shown manual iris control device or an automatic exposure control device, more specifically, the reference level setting circuit 6 converts the range of depth of focus relating to the respective F-numbers of the photographing lens, which have been calculated previously, into the electric signal level as the judgement level such as voltage, current or logic signals. Moreover, said reference level setting circuit 6 and the aforementioned comparator circuit 5 constitute together a judgement circuit for the aforementioned focused condition detecting circuit 4 so that the output of this focused condition detecting circuit 4 is judged by the judgement circuits 5 and 6 as to whether or not it is within the range of depth of focus of the diaphragm value for photography. If, therefore, a light emitting diode or the like of the display circuit 7 is lit when the output of the focused condition detecting circuit is lower than the judgement level, it is possible to confirm with the lit display that the film plane is located within the respective ranges of depth of focus for the diaphragm value even if this diaphragm value for photography takes any value. In other words, the photographer need not accomplish the focusing operations with unnecessarily high focusing sensitivity. In this instance, a plurality of light emitting diodes may be provided so that all of them are lit when the output of the detecting circuit 4 is within the range of depth of focus, so that a smaller number of diodes are lit when the output of the circuit is slightly shifted out of the range of depth of focus, and so that all of the diodes are put out in the other modes of operation. In case, moreover, use is made of a focused condition detecting circuit of such a construction as has its output increased the more as the focus point is reached the more, the purpose is likewise attained if the display is continued while the output is higher than the judgement level.

Although as has been described, the range of depth of focus may be varied with the variation in the focal length even for the case of a camera equipped with a variable focal length lens such as a zoom lens. Even in this instance, it is possible to use substantially as it is the judgement level changing method for the aforementioned case, in which the diaphragm is stopped down from the wide-open iris to the partial iris. In this case, more specifically, it is sufficient that the judgement level corresponding to the range of depth of focus in the short focal length is set as the reference judgement level in the aforementioned reference level setting circuit 6 and that the variation in the judgement level corresponding to the range of depth of focus relating to the respective various focal lengths can be made in response to the focal length varying operations such as to the zooming operations. In the actual design, incidentally, it is necessary to construct the reference level setting circuit such that the multiplexing operation between the change in the judgement level accompanying the variation in the focal length and the change in the judgement level accompanying the change of the value of a diaphragm which is mounted in the variable focal length lens such as the zoom lens can be carried out as by focal length or aperture value output circuit 10 shown in FIG. 3.

As has been described, the differences in the wide-open F-number, focal length and construction of interchangeable lenses exert influences upon the variation in the range of depth of focus. The problem of the change in the judgement lever in this case can also be considered substantially in the same manner as the aforementioned problems of the change in the judgement level in case the diaphragm is stopped down from the wide-open iris to the partial iris and the change in the judgement level accompanying the change in the focal length. Similar solution can be prepared for the change in the judgement level due to the difference in the lens construction. In these cases, the manners to change the judgement level are divided into simple and multiplex ones in dependence upon the type of the photoelectric focus detecting device at the camera side and upon the kind of the interchangeable lens. In case, moreover the necessity for changing the judgement level accompanying the change in the diaphragm value is added, it is needless to say that this change has to be multiplexed.

Figure 5:
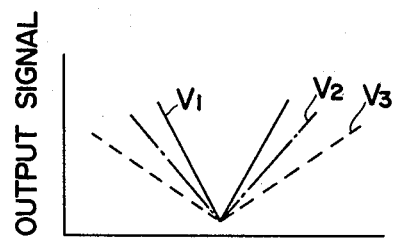
FIG. 5 is an explanative view illustrating that the output of a focused condition detecting circuit is varied with the wide-open F-number of an interchangeable lens.
Figure 4:
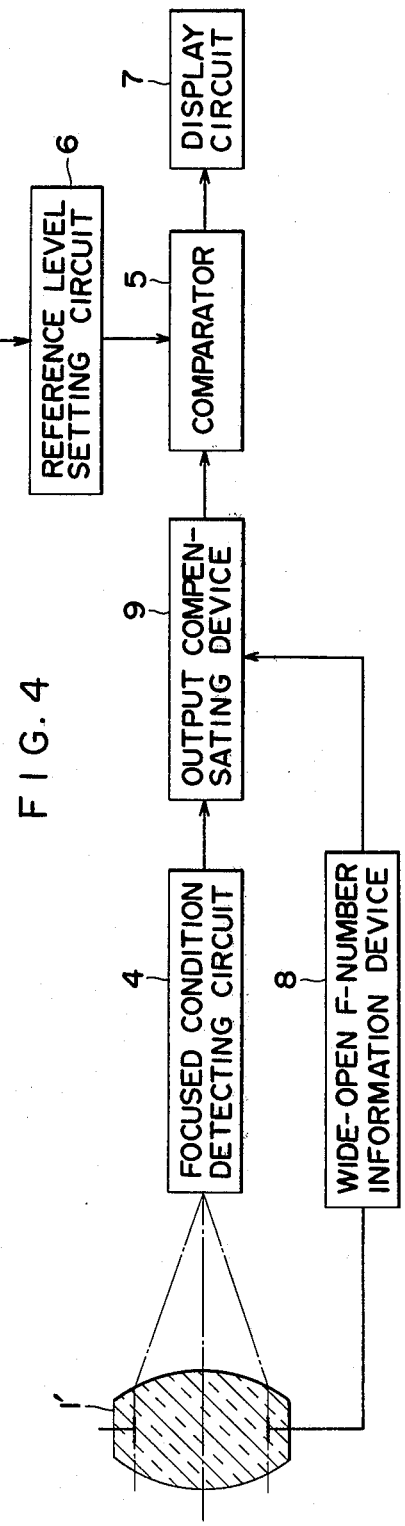
FIG. 4 is also a block diagram but shows another embodiment of the present invention.

FIG. 4 shows another embodiment, which is made in case the judgement level is changed on the basis of the difference in the wide-open F-number of the interchangeable lens and in case the change in the judgement level accompanying the change in the diaphragm value is also performed, and illustrates a system for compensating the output of the focused condition detecting circuit 4. Like reference numerals appearing in FIG. 4 indicate like parts or elements shown in FIGS. 1 to 3. Indicated at reference numeral 8 is a wide-open F-number information device, which is mounted at the side of an interchangeable lens 1' and the information of which is fed either by a mechanically deformed portion such as a projection formed at the rear end of the lens or by an electric resistor. Indicated at numeral 9 is an output compensating device which is made operative to compensate the output of the aforementioned focused condition detecting circuit 4 and which is composed of a device such as a potentiometer. More specifically, since the output of the focused condition detecting circuit 4, which is on the basis of the difference in the wide-open F-number among the respective interchangeable lenses, has different angles, when it is increased after it has been decreased, as shown in curves $V_1$ to $V_3$ in FIG. 5, the output compensating device 9 has to be so constructed that the angles defined by the corresponding curves $V_1$ to $V_3$ become identical to that to act as a reference. If this construction is made, the output of the output compensating device 9 will take the output characteristics, as shown in FIG. 2. As a result, the subsequent operations can be performed substantially in the same manner as that for the case of the change in the judgement level accompanying the change in the diaphragm value, as shown in FIG. 3.

More specifically, in case the interchangeable lens 1 is mounted in the camera, the compensation of the judgement level based upon the difference in the wide-open F-number is accomplished substantially by the aforementioned output compensating device 9, whereas the change of the judgement level accompanying the change in the diaphragm value by the diaphragm in the interchangeable lens 1 is accomplished by the reference level setting circuit 6 and circuit 10.

In an alternative, moreover, the construction is made such that the information of the wide-open F-number information device 8 is fed directly to the reference level setting circuit 6 so that the reference level may be changed and set in said circuit 6. In the case of the change in the judgement level based upon the difference in the focal length or the lens construction, the aforementioned methods can also be used. In any case, it is convenient that the changing operations are made responsive to the lens interchanging operations.

Although all of the foregoing embodiments illustrate the photoelectric focus detecting device of the so-called "TTL" type, in which the light receiving unit of the focused condition detecting circuit 4 is arranged in the rear optical path of the photographing lens, the present invention should not be limited thereto. For instance, in case a light receiving optical system is provided separately of the photographing lens, the aforementioned light receiving unit of the detecting circuit can be arranged outside of the optical path of the photographing lens. On the other hand, the focused condition detecting device may be either of triangulating system or of a system, in which the extent of being out of focus is used.

In the embodiments thus far shown, moreover, the change in the range of the focused condition accompanying the change in the range of depth of focus is accomplished both by the change in the reference value or range of the focused condition setting circuit and by the change in the output compensation relating to the intrinsic characteristics of the lens. Either compensating means may be employed in either case. Since, moreover, there is no reason for the present invention to be limited to such changing means, the present invention can be modified to include another suitable means.

On the other hand, the camera can be of any type, and it is needless to say that the present invention can be put into practice even if the camera is equipped with an automatic focus detecting device.

When the camera according to the present invention is used, as has been described hereinbefore, the sensitivity in the focus detection need not be excessive with the resultant effect that the photographer is not required to handle highly complicated techniques.

What is claimed is:

1. A camera including a photoelectric focus detecting device, comprising: a focused condition detecting circuit made receptive of the light coming from an objective lens for generating output signals according to the focused condition; a reference level setting circuit; a comparator circuit for comparing the output of the focused condition detecting circuit and the reference level of the reference level detecting circuit; display circuit for displaying the compared results of the comparator circuit; means for controlling the reference level setting circuit thereby to vary a reference level in accordance with a range of depth of focus or field of the objective lens, a wide-open F-number information device for generating an information indicative of a difference in a wide-open F-number of an interchangeable lens; and an output compensating device connected between the focused condition detecting circuit and the comparator circuit, whereby the output compensating device is controlled by the output of the wide-open F-number information device.

* * * * *